United States Patent
Rudell

(10) Patent No.: US 6,532,294 B1
(45) Date of Patent: Mar. 11, 2003

(54) AUTOMATIC-ON HEARING AIDS

(76) Inventor: Elliot A. Rudell, 30507 Rhone Dr., Rancho Palos Verdes, CA (US) 90275

( * ) Notice: Subject to any disclaimer, the term of this patent is extended or adjusted under 35 U.S.C. 154(b) by 0 days.

(21) Appl. No.: 09/610,234

(22) Filed: Jul. 5, 2000

Related U.S. Application Data

(63) Continuation-in-part of application No. 09/253,180, filed on Feb. 19, 1999, now Pat. No. 6,325,693, which is a continuation of application No. 09/626,292, filed on Apr. 1, 1996, now abandoned.

(51) Int. Cl.$^7$ ............................................. H04R 25/00
(52) U.S. Cl. ...................................... 381/315; 381/314
(58) Field of Search ................................ 381/315, 174, 381/314, 323; 340/586, 573.1, 825.19, 384.1

(56) References Cited

U.S. PATENT DOCUMENTS

| | | | |
|---|---|---|---|
| 3,598,928 A | 8/1971 | Hickox | |
| 3,783,201 A | 1/1974 | Weiss et al. | |
| 3,852,540 A | 12/1974 | Diethelm | |
| 3,983,336 A | 9/1976 | Malek et al. | |
| 4,476,353 A | 10/1984 | Haertl | |
| 4,539,440 A | 9/1985 | Sciarra | |
| 4,679,240 A * | 7/1987 | Heide | ............... 327/306 |
| 4,870,688 A | 9/1989 | Voroba et al. | |
| 4,937,876 A | 6/1990 | Biermans | |
| 4,955,729 A * | 9/1990 | Marx | ............... 381/123 |
| 5,365,593 A * | 11/1994 | Greenwood et al. | ....... 200/52 R |
| 5,881,158 A * | 3/1999 | Lesinski et al. | ............ 381/174 |
| 5,889,874 A | 3/1999 | Schmitt et al. | |
| 6,067,006 A * | 5/2000 | O'Brien | ............... 340/384.1 |

* cited by examiner

Primary Examiner—Curtis Kuntz
Assistant Examiner—P. Dabney
(74) Attorney, Agent, or Firm—Irell & Manella, LLP

(57) ABSTRACT

A hearing aid that automatically turns on when placed in an ear. In one embodiment, the hearing aid has a pair of electrodes that are coupled to a hearing circuit and a power source. Placing the electrodes in contact with an ear closes a circuit between the power source and the hearing circuit so that power is provided to the circuit. The circuit is opened and power is terminated from the hearing circuit when the hearing aid is removed from the ear. In another embodiment, the hearing aid includes a temperature sensor that is coupled to the hearing circuit and the power source. Power is provided to the hearing circuit when the hearing aid is placed within an ear and the temperature sensor senses the body temperature of the user. In yet another embodiment, the hearing aid includes a contact sensor that closes a circuit between the hearing circuit and the power source when the hearing aid is placed within an ear.

9 Claims, 1 Drawing Sheet

AUTOMATIC-ON HEARING AIDS

REFERENCE TO CROSS-RELATED APPLICATIONS

This application is a continuation-in-part of application Ser. No. 09/253,180, filed on Feb. 19, 1999, U.S. Pat. No. 6,325,693, which is a continuation of application Ser. No. 08/626,292, filed on Apr. 1, 1996, now abandoned.

BACKGROUND OF THE INVENTION

1. Field of the Invention

The present invention relates to hearing aids.

2. Background Information

There have been developed various hearing aids to assist users who suffer from a loss of hearing. For example, U.S. Pat. Nos. 4,937,876; 3,938,336; 5,889,874 and 4,476,353 all disclose devices for assisting hearing loss.

Hearing aids typically contain a battery that powers electrical circuits that amplify sound. To conserve power the hearing aid may have an on/off switch that allows a user to disconnect the battery from the circuits. The on/off switch must be constructed relatively small to allow the hearing device to fit within the ear. Small switches can be difficult to manipulate, particularly for elderly users who have arthritic conditions. Additionally, the user may forget to turn the hearing aid off when not in use, thereby resulting in a waste of power.

BRIEF SUMMARY OF THE INVENTION

One embodiment of the present invention is a hearing aid that includes a pair of electrodes coupled to a hearing circuit and a power source. Power is provided to the hearing circuit when the electrodes are in contact with an ear.

DETAILED DESCRIPTION OF THE PREFERRED EMBODIMENT

In general the present invention includes a hearing aid that automatically turns on when placed in an ear. In one embodiment, the hearing aid has a pair of electrodes that are coupled to a hearing circuit and a power source. Placing the electrodes in contact with an ear closes a circuit between the power source and the hearing circuit so that power is provided to the circuit, because the skin surface will conduct electricity. The circuit is opened and power is terminated from the hearing circuit when the hearing aid is removed from the ear. In another embodiment, the hearing aid includes a temperature sensor that is coupled to the hearing circuit and the power source. Power is provided to the hearing circuit when the hearing aid is placed within an ear and the temperature sensor senses the body temperature of the user. In yet another embodiment, the hearing aid includes a contact sensor that closes a circuit between the hearing circuit and the power source when the hearing aid is placed within an ear.

Figure 1:
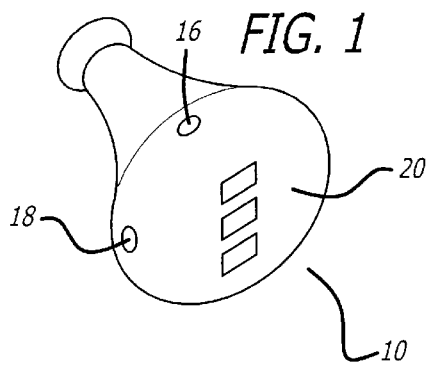
FIG. 1 is an illustration of an embodiment of a hearing aid of the present invention.
Figure 2:
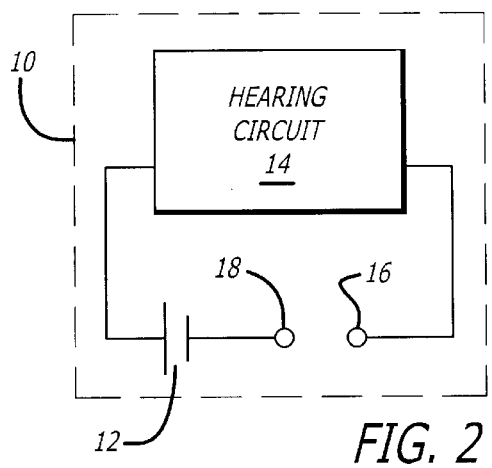
FIG. 2 is a schematic of the hearing aid.

Referring to the drawings more particularly by reference numbers, FIGS. 1 and 2 show an embodiment of a hearing aid 10 of the present invention. The hearing aid 10 may be placed in the ear of a user. The hearing aid 10 may include a power source 12 that is coupled to a hearing circuit 14. The hearing circuit 14 can receive sound and then transmit the sound to the user. The power source 12 may be a battery that provides power to the hearing circuit 14.

The hearing aid 10 may also have a first electrode 16 coupled to the hearing circuit 14 and a second electrode 18 coupled to the power source 12. The electrodes 16 and 18 can be attached to an outer surface of a housing 20 that encloses the power source 12 and the hearing circuit 14. The electrodes 16 and 18 come into contact with skin when the hearing aid 10 is placed in an ear. The skin closes the circuit between the power source 12 and hearing circuit 14 so that power is provided to the circuit 14. When the hearing aid 10 is removed from the ear, the circuit is again open and power is not provided to the hearing circuit 14. The hearing aid of the present invention thus automatically turns on and off when the aid is placed into the ear and removed from the ear, respectively.

Figure 3:
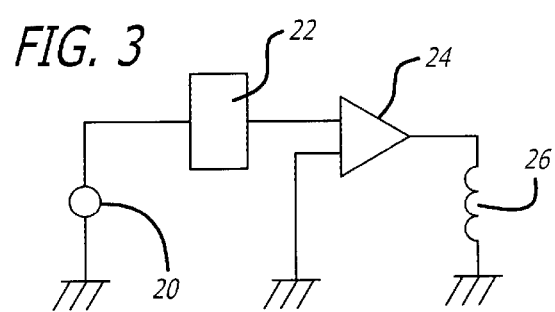
FIG. 3 is a schematic of an embodiment of a hearing circuit of the hearing aid.

FIG. 3 shows an embodiment of a hearing circuit 14. The circuit 14 may include a microphone 20 that converts sound into an electric signal. The microphone 20 may be coupled to a filter circuit 22 that filters noise. The filtered signal is amplified by an amplifier circuit 24. The amplifier 22 may be connected to a speaker coil 26 that converts the filtered amplified signal to sound that is directed into the ear of the user.

It is to be understood that other hearing circuit embodiments may be employed, for example, the coil 26 may create mechanical vibrations that are transmitted into the skull of the user. This type of device is typically referred to as a "bone phone". Additionally, the circuit 14 may include a microprocessor to process the conversion of sound.

Figure 4:
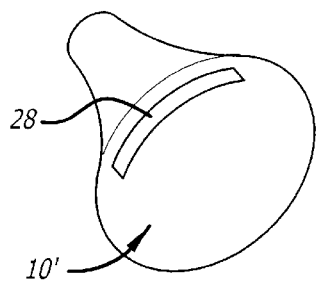
FIG. 4 is an illustration of an alternate embodiment of the hearing aid.
Figure 5:
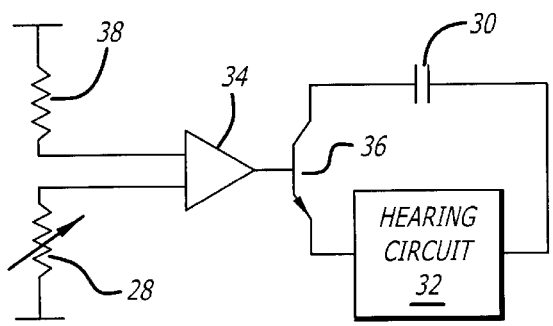
FIG. 5 is a schematic of the hearing aid shown in FIG. 4.

FIGS. 4 and 5 show another embodiment of a hearing aid 10' that has a temperature sensor 28. The temperature sensor 28 can be coupled to a power source 30 and a hearing circuit 32 by a comparator 34 and a switch 36. The temperature sensor 28 may include a variable resistor that has a resistance which varies with temperature. When the hearing aid 10' is placed within an ear, the temperature of the resistor, and corresponding voltage across the resistor, will increase. The comparator 34 compares the sensor voltage with a voltage across a threshold resistor 38. When the sensor voltage is greater than the threshold voltage the comparator 34 provides an output that turns on the switch 36 and connects the power source 30 to the hearing circuit 32.

Figure 6:
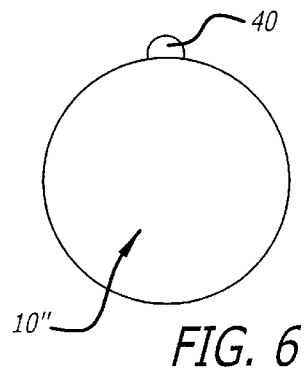
FIG. 6 is an illustration of an alternate embodiment of the hearing aid.
Figure 7:
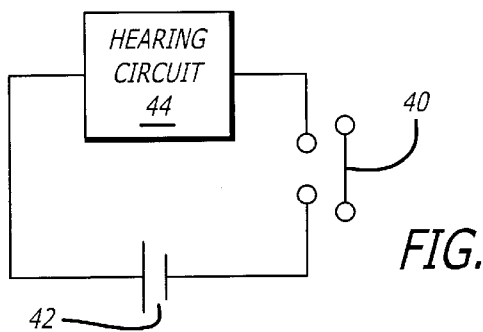
FIG. 7 is a schematic of the hearing aid shown in FIG. 6.

FIGS. 6 and 7 show another embodiment of a hearing aid 10" that has a contact sensor 40 coupled to a power source 42 and a hearing circuit 44. The contact sensor 40 is closed when the hearing aid 10" is placed within an ear. The closed contact sensor 40 connects the power source 42 to the hearing circuit 44. The contact sensor 40 may be spring biased so that the sensor 40 moves to an open position when the hearing aid 10" is removed from the ear.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hearing aid placed in contact with an ear of a user, comprising:
    a hearing circuit that can receive sound and transmit sound to the user;
    a power source coupled to said hearing circuit;
    a first electrode coupled to said hearing circuit; and,
    a second electrode coupled to said power source such that power is provided to said hearing circuit from said power source when said first and second electrodes come into contact with the ear, wherein current flows through the ear between said first and second electrodes.

2. The hearing aid of claim 1, wherein said hearing circuit includes a microphone that is coupled to an output device.

3. The hearing aid of claim 2, wherein said hearing circuit includes an amplifier connected to said output device.

4. The hearing aid of claim 3, wherein said output device is a speaker.

5. A method for turning on a hearing aid placed within an ear, comprising:
    placing a hearing aid in the ear, wherein the placement of the hearing aid in the ear turns the hearing aid on, wherein current flows through the ear between a first electrode and a second electrode of the hearing aid.

6. The method of claim 5, wherein the placement of the hearing aid within the ear closes a circuit to turn the hearing aid on.

7. The method of claim 5, wherein the hearing aid senses a temperature of the ear.

8. The method of claim 5, wherein the hearing aid senses a pressure exerted by the ear.

9. The method of claim 5, wherein the hearing aid turns off when the hearing aid is removed from the ear.

* * * * *